Patented Mar. 15, 1949

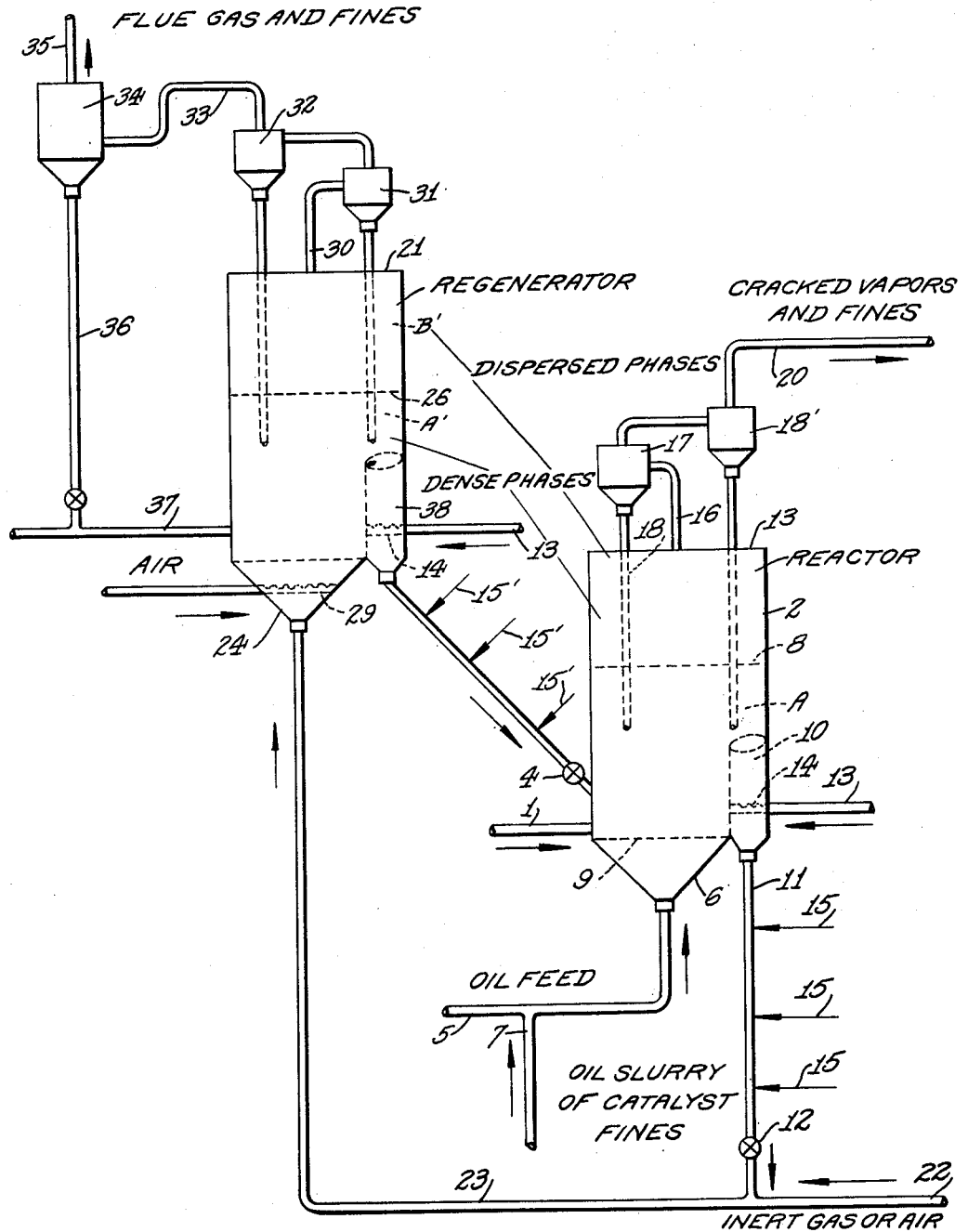

2,464,616

UNITED STATES PATENT OFFICE 2,464,616

CATALYTIC HYDROCARBON CONVERSIONS

Eugene F. Schwarzenbek, Nutley, and Joseph W. Moorman, Alpine, N. J., assignors to The M. W. Kellogg Company, Jersey City, N. J., a corporation of Delaware Original application May 9, 1944, Serial No. 534,782. Divided and this application January 31, 1946, Serial No. 644,558

1 Claim. (Cl. 196—52)

The present invention pertains to improvements in processes for the catalytic conversion of hydrocarbons and analogous reactions, involving the contacting of a reactant in the gaseous or vapor phase with a finely divided solid contact agent. More particularly, the invention is concerned with improvements in such processes wherein the gaseous or vaporous reactant is flowed upwardly through the contacting or conversion zone in contact with the particles of solid material at a relatively low velocity adapted to maintain two distinct phases of suspended solid particles therein, a lower dense turbulent phase and an upper dispersed phase in which the quantity of solid material per unit volume is very small relative to that contained in the dense phase.

Continuous processes of this type have come into widespread commerical use particularly in the catalytic cracking of high boiling hydrocarbons to produce gasoline of high anti-knock quality. In such continuous processes, popularly designated by the term "Fluidized catalyst" processes, the catalytic material in powdered condition is continually and successively circulated through a conversion zone and a regeneration zone. In the conversion zone the catalyst particles gradually become inactive due to the deposition of a carbonaceous deposit thereon constituting a by-product of the conversion reaction, and this deposit is thereafter removed by combustion during the passage of the catalyst particles through the regeneration zone. In either, and usually in both of these zones, the desired "fluidized" condition of the catalyst is maintained by flowing the vapor phase reactant upwardly therethrough within a restricted velocity range in contact with the mass of catalyst particles. Although such processes at the present time have been practiced commercially, principally with respect to catalytic cracking, they are applicable to a wide range of processes for the conversion of or production of hydrocarbon products and chemical conversions and treatments generally involving the contact of gases and solids.

Processes of this character are subject to a number of serious disadvantages due to the presence of the upper light dispersed solid phase. Since the contact materials employed are expensive it is usually essential to accomplish substantially complete recovery of the solids present in this dispersed phase. This result necessarily entails the provision of expensive types of gas-solid separation equipment, such as Cottrell precipitators and the like, and even with such equipment part of the circulated catalyst is normally lost to the atmosphere or otherwise from the process proper. A further outstanding disadvantage arising from the presence of catalyst in the dispersed phase is the continuance of the reaction under conditions which may be undesirable and which are not amenable to satisfactory and ready control.

The present invention has among its objects the provision of a process of the above character wherein the desired reaction promoted or sustained by the solid contact agent is largely confined to the dense turbulent phase and is thereby more readily satisfactorily controlled. A further important object of the invention is the maintenance of the solid particles which catalyze, promote or otherwise sustain the desired reaction, in the desired dense fluidized turbulent condition in the lower phase, and concurrently to minimize the loss of these active particles in connection with the recovery of the suspended solid particles from the dispersed phase.

In proceeding pursuant to this invention in its preferred aspects the finely divided solid material introduced to the contacting zone comprises two components, one consisting entirely or largely of relatively coarse particles which actively catalyze, promote or sustain the desired reaction, and the second of relatively fine particles which are relatively inert or inactive.

Pursuant to one example illustrating the particle sizes and composition of the finely divided solids, and conditions utilized in the practice of the invention, a relatively coarse cracking catalyst was mixed with an equal amount by weight of relatively fine crystalline silica which was relatively inert with respect to its capability of catalyzing or promoting the reactions involved in cracking high boiling hydrocarbons to produce gasoline of high anti-knock quality. In this case the cracking catalyst was a synthetically produced compound composed of alumina and silica, and consisted of particles in sizes varying essentially between 60 and 140 mesh. The finely divided inert crystalline silica component consisted of particles most of which were finer than 140 mesh.

The cracking catalyst, the inert, and the blend of these two materials had the following size distribution:

|  | Cracking Catalyst | Inert | Blend |
|---|---|---|---|
|  | Percent by weight | Percent by weight | Percent by weight |
| +40 mesh | Trace | Trace | Trace |
| −40+60 | 5 | 1 | 5 |
| −60+80 | 25 | 3 | 16 |
| −80+100 | 22 | 1 | 12 |
| −100+120 | 32 | 4 | 14 |
| −120+140 | 10 | 4 | 7 |
| −140+200 | 6 | 13 | 9 |
| −200 | Trace | 74 | 37 |

A bed of this blend of cracking catalyst and inert was provided in a tube 12 feet in length and 3 inches in diameter, and air passed upwardly through the tube at a velocity of 1 foot per second. Under these conditions two distinct suspended phases of the solid particles were observed in the tube, a lower dense turbulent phase and an upper light dispersed phase, both being of the general type characteristically produced and utilized in conventional "fluidized catalyst" systems. In this example the height of the dense turbulent phase was about 6 feet and the height of the light dispersed phase or "disengaging" zone was about 6 feet. Determinations were made of the amount of entrainment of total solids in the light dispersed phase, and also of the percentage of catalyst present in the dense phase at various points and in the dispersed phase with the results tabulated below:

| Per cent Catalyst Feed Powder | Dense Phase Density lb./cu. ft. at 1 ft./sec. | Entrainment Dispersed Phase lb./cu. ft. at 1 ft./sec. | Per cent Catalyst In Mixture ||||
|---|---|---|---|---|---|---|
|  |  |  | Dense Phase ||| Entrained Material |
|  |  |  | Btm. | Mid. | Top |  |
| 50 | 36 | 0.0022 | 49 | 54 | 51 | 1.1 |

As shown by the above data, the amount of catalyst in the bed varied between 49 and 54 percent whereas the catalyst in the overhead stream was only 1 percent of the total solid particles suspended therein. In accordance with the principle thus demonstrated, it is apparent that by suitable selection of the two components of the introduced solids with respect to their particle size and/or density, these may be provided so as to result in little classification or segregation in the dense phase but very pronounced classification of these components in the upper dilute phase. The presence of the finely divided inert particles serves to enhance the fluidizing properties of the relatively coarse catalytic material and concurrently there is relatively little carry-over of the catalytic material to the dilute upper phase. Two important results are accomplished by this procedure; first, the minimization of the loss of catalytic material in the gas-solid separation system utilized to recover solids from the dispersed phase, and second, the presence of catalytic material in other parts of the system, other than in the dense phase, is likewise minimized. The latter condition is of substantial importance since an advantage inherent in the dense turbulent bed resides in the uniformity of temperature produced throughout this phase by the turbulent movement of the catalyst particles and extensive "internal recycling" of these particles. Accordingly, in most cases it is highly desirable that the reaction which is promoted or sustained by the presence of the finely divided solids, be confined to the dense phase zone characterized by this internal recycle.

The catalyst particles used in the above example ranging from 60 to 140 mesh, are all of such size and density as to have free settling rates in air in excess of 1 foot per second. The second component, the finely divided inert solids, consisted of particles all or a very large proportion of which had free settling rates less than 1 foot per second. The relatively coarse component may include a substantial amount of inert particles in addition to the catalytic particles. For instance, in the above specific example a substantial amount of the added inert silica particles have free settling rates in excess of the maintained operating gas velocity of 1 foot per second. The use of such coarse inert particles is advantageous when it is desired to circulate a stream of solid particles for the purpose of functioning as a "heat carrier"; for example, between an endothermic conversion zone and an exothermic regeneration zone and the desired rate of solid particles circulation is greater for the heat carrier function than the desired or optimum rate from the standpoint of catalytic activity alone.

It was further observed that in the absence of the second component, the maintenance at the maintained velocity of satisfactory "fluidized" properties in the bed was extremely difficult if indeed feasible at all.

In the practice of the invention, the first component, the relatively coarse particles, are preferably provided in or fed to the process in an amount in excess of about 40 percent of the total solids and in most cases more advantageously in excess of about 75 percent, by weight. Further, these particles while relatively coarse in the sense that their free settling rate is in excess of the maintained upward velocity of the reactant gas, are preferably of a size and/or density that they are capable of only relatively slow free fall through the gaseous reactant at the maintained upward velocity of the gaseous reactant under free settling conditions. The second component preferably constitutes not in excess of 60 percent of the total solids feed and generally less than 25 percent. In the practice of the process in its preferred aspect, the second component consists of particles which are substantially "inert" as to their capability of promoting or sustaining the desired reaction; however, in its broader aspects the invention includes within the numerical limits and under conditions above set forth the use of solid particles all of which are active. In its preferred aspects the invention further includes the utilization of a fines component which is only relatively catalytically inert, for example, the crystalline silica component used in the above example in combination with a synthetic alumina-silica cracking catalyst which are highly active may be replaced by an activated clay type catalyst such as "Superfiltrol" which are active cracking catalysts but substantially less active than the more efficient synthetic types.

Further features, advantages and objects of the invention will be apparent from the following detailed description of the practice of a preferred embodiment thereof, given in connection with the appended drawing which illustrates diagrammatically a suitable arrangement of apparatus and process flow for the practice of the process, for the purpose of catalytically cracking high boiling hydrocarbons to gasoline of high anti-knock quality.

Referring to the drawing, the principal elements of the system comprise a catalytic conversion vessel and a catalytic regeneration vessel, carrier lines for introducing the oil feed and oxygen-containing gas respectively into these vessels, solid-gas separators for recovering solids from the dispersed catalyst phases and returning them to the system, and catalyst standpipes for circulating catalyst between the vessels.

The illustrated system and process flow is of the type suitable for the practice of a continuous cyclic process for the catalytic conversion of hydrocarbons such as the conversion of high boiling hydrocarbons to gasoline of high anti-knock quality.

Finely divided solids of the composition above described may be initially added to the system at any point in the circuit such as through line 1. After the system is in operation it is only necessary to add make-up solids through this line for the purpose of compensating for solids lost from the system or for the purpose of compensating for contact material which becomes permanently lowered in activity. After the operation is initiated the finely divided contact material is supplied to the converter 2 from the lower portion of standpipe 3, the rate of flow of catalyst through the standpipe being controllable by valve 4.

The reactant gas is supplied to the lower part of the reactor and passed upwardly therethrough. As shown, a suitable cracking stock, such as vaporized gas oil, is supplied through transfer line 5 to the apex of the distributing cone 6. The hydrocarbon feed may be either in the vapor phase or liquid and the hot catalyst in the latter case utilized to produce the required vaporization in the lower part of the reactor, as described in Belchetz Patent 2,253,486. A recycled product consisting of an oil slurry of catalyst fines, produced as hereinafter described, may also be introduced through line 7 to the reactor via line 5. The quantity of the gaseous reactant supplied and its consequent velocity upwardly through the conversion zone, is such as to maintain the two distinct phases of suspended solid particles concentration therein, as previously described, the boundary line between these zones being indicated by the upper dotted line 8. The lower dense turbulent zone extends downwardly from line 8 to a horizontal plane 9 which coincides approximately with the upper boundary of the distributing cone 6. Solid particles are withdrawn from the dense phase through an outlet pipe 10 which has its upper opening terminating directly in the dense phase indicated by A. The withdrawn catalyst flows downwardly through pipe 10 and then through a vertically extending catalyst standpipe 11, the rate of discharge from the standpipe and withdrawal of solids from the dense phase being regulated by valve 12 at its base. The solids passing through catalyst outlet pipe 10 may be maintained in a dense but flowable condition by an aerating and stripping gas supplied through line 13 and distributor 14 disposed in the base thereof. Similar aerating lines 15 are provided at spaced vertical intervals along the length of the standpipe 11. The solids flowing through pipes 10 and 11 normally will be aerated to a somewhat less degree and consequent higher density than dense phase A.

By the described arrangement finely divided solids may be circulated through the dense phase zone A at any desired rate over wide limits and the density of the dense phase maintained substantially independent of the catalyst circulation rate. In catalytic cracking this circulation rate is normally within the range of about 2 to 25 parts of catalyst to 1 part of oil by weight. It is considered preferable to operate with a relatively high catalyst to oil circulation rate or ratio as described in Belchetz Patent 2,253,486.

In their passage upwardly through dense phase A the introduced hydrocarbons undergo cracking or conversion to the desired products, this conversion in most instances taking place largely during the passage through the dense phase. The reaction, however, may continue during the passage of the vapors through the dispersed phase or disengaging zone B and this tendency obviously will be promoted to the extent of the quantity of catalytic material present therein. By reason of the introduction of the finely divided inactive or inert solids of the size, distribution and composition above described, the disengaging zone B is maintained relatively free of catalytic particles and confinement of the desired conversion reaction to the dense phase thereby enhanced.

The vaporous conversion products are withdrawn from the upper portion of disengaging zone B through line 16 and passed through a suitable gas-separation system, comprising cyclone separators 17 and 18' arranged in series. The suspension of entrained particles and vapors passes successively through these separators, part of the entrained material being removed in each and being suitably returned to the dense phase through tail pipes 18 and 19, extending from the lower collecting hoppers in the bottom of the cyclone separators. The vaporous conversion products from which most of the entrained material has been effected by this separation then passes by transfer line 20 to any suitable form of separation and recovery equipment, such as a fractionating column. The relatively small quantity of residual solids remaining in the vapors may be recovered as a slurry by partial condensation as described in said Belchetz patent, and returned to the system through line 7. In operating, pursuant to the present invention, it is apparent that the proportion of catalytic material in the total solids returned to the system by the oil slurry will be greatly reduced.

Used catalyst withdrawn from the conversion zone through standpipe 11 is continually transferred to a regenerator 21 for the purpose of removing carbonaceous deposit, deposited thereon incident to the conversion reaction. The used contact material is picked up from the lower end of standpipe 11 by a suitable carrier gas supplied through line 22. This gas may be either an inert gas such as flue gas, or a portion of or all of the air utilized in the subsequent combustion of the carbonaceous deposit. The particles are thus carried by the gas through transfer line 23 and supplied to the distributing cone 24 in the lower portion of the regenerator 21. All or a portion of the air utilized for regeneration may be supplied through distributor 29 arranged in the lower portion of regenerator 21 in close proximity to the dense phase A'. The cross-sectional area of the regeneration zone, as in the case of the reactor, and consequent gas velocity upwardly therethrough, is such that two phases of suspended solid particles are maintained therein as in the case of the reactor, the boundary between these phases A' and B' being indicated by the dotted line 26. During the passage of the air through the dense phase, combustion of the carbonaceous deposits occurs and concurrently the temperature throughout the dense phase is maintained substantially constant by reason of the intensive internal recycling and turbulence of the solid particles therein. Since relatively little carbonaceous deposit is accreted on catalytically inert particles, such as crystalline silica above described, during their passage through the conversion zone, the disengaging zone is relatively free of carbon-bearing particles and little if any combustion or "after-burning" will occur in this zone. This effect is highly advantageous since the tendency towards over-heating and permanent deactivation of the catalytic particles is prevented thereby. This condition is further promoted by the use of an inert gas rather than air to transfer the used catalyst through transfer line 23 and by supplying all or substantially all of the necessary air directly below the dense solid phase through distributor 29. Flue gas and entrained solids are withdrawn by line 30 from the upper portion of zone B' and passed through gas-solid separators 31 and 32, similar in design and operation to those provided on the conversion side of the system. Residual solids present in the flue gas exiting from the cyclone separator system through line 33, are suitably separated by passage through a Cottrell precipitator 34 which serves to remove all but a small percentage of the total circulated solids. Regardless of the relative efficiency of the Cottrell precipitator very substantial losses of expensive catalytic material occur in normal operation to the atmosphere by reason of the presence of fines in the effluent to the atmosphere from precipitator 34 through outlet 35.

Pursuant to this invention the quantity of catalytic particles present in the effluent gas as discharged from the process constitutes a very small portion of the total solids thus discharged. Solids recovered in the Cottrell are withdrawn from the lower hopper through catalyst standpipe 36 and are returned to the system through line 37.

Regenerated catalyst is withdrawn from dense phase A' in the regeneration vessel through an outlet 38 designed and operated similar to outlet 10 on the conversion side. Regenerated catalyst is preferably supplied to the reaction vessel by catalyst standpipe 3 terminating directly in dense phase A, as shown. As an alternative, this standpipe may terminate directly in transfer line 5, and the regenerated catalyst is thus carried in suspension through the carrier line 5 and distributing cone 6 into the dense solids phase. The first arrangement is considered preferable since as in the case of the regeneration zone contact of the reactant vapor with the catalytic zone under any condition other than the uniform temperature condition provided by the turbulent dense solid phase is obviated.

In the above procedure the reaction which occurs in the conversion zone 2 is catalytic and endothermic whereas the combustion reaction in the regeneration zone 21 is non-catalytic and exothermic. Accordingly, the "active" particles in the conversion zone are active in the sense that they catalyze or promote the desired reaction, and in the regeneration zone the "active" particles are such in the sense that they sustain the desired reaction by reason of the presence of carbonaceous material thereon.

Although the invention has been described in the foregoing with particular reference to a cyclic process for the cracking of high-boiling hydrocarbons, it will be apparent that the principles thereof are applicable to a wide range of chemical conversion and treating operations generally involving the contacting of finely divided solids with a reactant or treating gas including hydrocarbon conversions such as dehydrogenation, cyclization and aromatization of straight chain hydrocarbons to aromatics, hydrocarbon oxidation, Fischer-Tropsch synthesis and numerous other reactions.

It will be apparent to those skilled in the art that the arrangement of apparatus and process flow given above is illustrative and various changes and modifications may be made therein without departing from the essential features of the invention.

This application is a division of prior co-pending application Serial No. 534,782, filed May 9, 1944.

We claim:

In a continuous process for effecting catalytic reactions in which a finely divided catalyst is continuously circulated between a reaction zone in which it is contacted with the gaseous reactant and in which carbonaceous materials are deposited on the catalyst particles and a regeneration zone in which the contaminated catalyst is contacted with an oxygen-containing gas to remove carbonaceous deposits by combustion, the improvement which comprises introducing into said regeneration zone a mixture of said finely divided catalyst containing carbonaceous deposits and a relatively inert finely divided solid consisting essentially of particles having settling rates lower than the settling rates of said active catalyst, passing an oxygen-containing gas upwardly through the regeneration zone in contact with the mixture of active catalyst and relatively inert solids at a velocity to maintain two distinct phases of suspended solid particles in the regeneration zone, said phases including a lower dense turbulent catalyst phase and an upper light diffuse phase containing suspended inert solids and relatively free of catalyst particles, withdrawing combustion gas from the portion of said regeneration zone containing said diffuse phase, separating solids suspended in said combustion gas, returning solids thus separated to the regeneration zone and into said lower dense phase, separately withdrawing solids from said regeneration zone directly from said lower dense phase, and transferring said last-mentioned withdrawn solids to said reaction zone.

EUGENE F. SCHWARZENBEK.
JOSEPH W. MOORMAN.

REFERENCES CITED

The following references are of record in the file of this patent:

UNITED STATES PATENTS

| Number | Name | Date |
|---|---|---|
| 2,325,611 | Keranen | Aug. 3, 1943 |
| 2,326,705 | Thiele et al. | Aug. 10, 1943 |
| 2,341,193 | Scheineman | Feb. 8, 1944 |
| 2,361,978 | Swearingen | Nov. 7, 1944 |
| 2,387,309 | Sweeney | Oct. 23, 1945 |
| 2,393,839 | Thomas et al. | Jan. 29, 1946 |
| 2,396,709 | Leffer | Mar. 19, 1946 |